United States Patent
Moon et al.

(10) Patent No.: US 12,221,035 B2
(45) Date of Patent: Feb. 11, 2025

(54) SYSTEM FOR AGRICULTURAL MACHINE WITH ACCIDENT PREVENTION FUNCTION AND METHOD OF PERFORMING SAME

(71) Applicant: INPLAB Inc., Gimcheon-si (KR)

(72) Inventors: Yong Min Moon, Seoul (KR); Jung Hyo Lee, Gimcheon-si (KR); Min Gyu Kim, Gimcheon-si (KR)

(73) Assignee: INPLAB INC., Gimcheon-si (KR)

( * ) Notice: Subject to any disclaimer, the term of this patent is extended or adjusted under 35 U.S.C. 154(b) by 226 days.

(21) Appl. No.: 18/088,985

(22) Filed: Dec. 27, 2022

(65) Prior Publication Data
US 2024/0051463 A1   Feb. 15, 2024

(30) Foreign Application Priority Data
Aug. 10, 2022 (KR) .................. 10-2022-0100236

(51) Int. Cl.
*B60Q 9/00* (2006.01)
*A01B 76/00* (2006.01)

(52) U.S. Cl.
CPC ............. *B60Q 9/00* (2013.01); *A01B 76/00* (2013.01)

(58) Field of Classification Search
CPC .................................. B60Q 9/00; A01B 76/00
See application file for complete search history.

(56) References Cited

U.S. PATENT DOCUMENTS

| | | | |
|---|---|---|---|
| 6,002,974 A * | 12/1999 | Schiffmann | B60R 22/46 340/440 |
| 8,275,516 B2 * | 9/2012 | Murphy | B60W 50/14 701/124 |
| 10,821,992 B2 * | 11/2020 | Skillsäter | B60W 30/04 |
| 11,410,526 B2 * | 8/2022 | Green | B60Q 1/52 |
| 2011/0022267 A1 * | 1/2011 | Murphy | B60W 50/14 701/124 |
| 2018/0162410 A1 * | 6/2018 | Skillsäter | B60W 30/04 |
| 2020/0172087 A1 * | 6/2020 | Shur | E02F 9/2025 |
| 2020/0189507 A1 * | 6/2020 | Green | F16P 3/00 |
| 2020/0269854 A1 * | 8/2020 | Wei | B60W 40/10 |

* cited by examiner

Primary Examiner — Ramsey Refai
(74) Attorney, Agent, or Firm — Sughrue Mion, PLLC

(57) ABSTRACT

Disclosed herein is a system for preventing and notifying of an accident of an agricultural machine, which includes an agricultural machine accident prevention/notification server; a rollover accident detection device configured to control brightness of a display device according to a risk rating pre-assigned to a hazard area when an agricultural machine enters a hazard area and simultaneously provide an operating control command to an Internet of things (IoT) device and connected to a battery module of the agricultural machine to monitor an energy state of the battery module; and the IoT device configured to, when the operating control command is received from the rollover accident detection device, operate according to the operating control command to notify a driver of a vehicle within a radius therefrom of the presence of the agricultural machine.

8 Claims, 4 Drawing Sheets

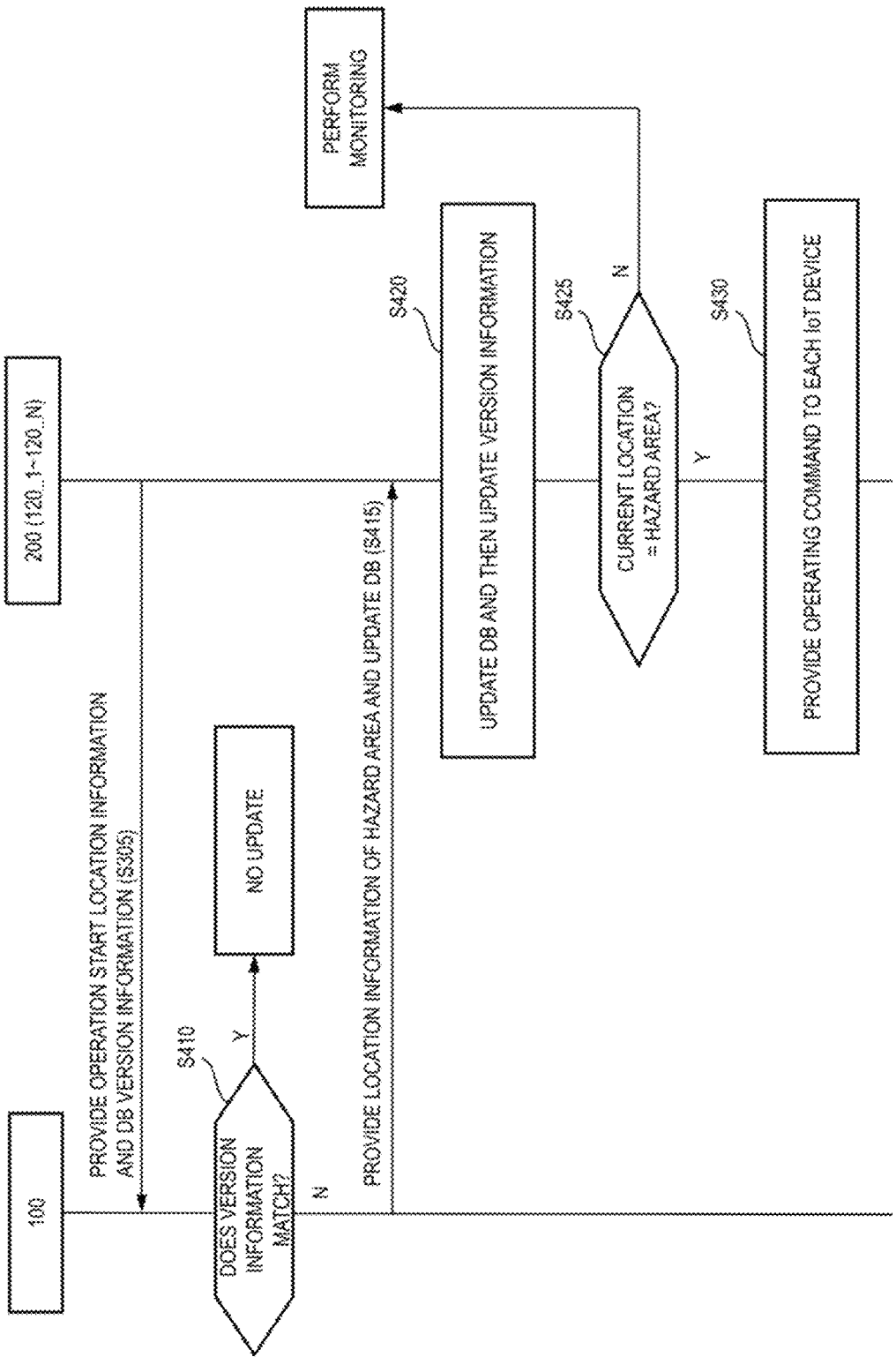

SYSTEM FOR AGRICULTURAL MACHINE WITH ACCIDENT PREVENTION FUNCTION AND METHOD OF PERFORMING SAME

CROSS-REFERENCE TO RELATED APPLICATION

This application claims priority to and the benefit of Korean Patent Application No. 10-2022-0100236, filed on Aug. 10, 2022, the disclosure of which is incorporated herein by reference in its entirety.

BACKGROUND

1. Field of the Invention

The present disclosure relates to a system for preventing and notifying of an accident of an agricultural machine and a method of performing the same. More specifically, the present disclosure relates to a system for preventing and notifying of an accident of an agricultural machine, which can prevent an accident of an agricultural machine by operating a display device to provide a safety warning to a rear driver when the agricultural machine is located within a hazard area, and a method of operating the same.

2. Discussion of Related Art

Agricultural machines are considered very important in reducing a high labor burden and a production cost in response to the decrease in the labor force in rural areas due to the shortage of labor and the aging population. Agricultural machines are for performing various tasks necessary for farming, such as plow work, rotary work, pest control work, and transplanting work. Agricultural machines are divided into walking-type agricultural machines which are operated while an operator walks with the agricultural machine, and ride-on agricultural machines in which the operator rides on a driver seat provided in the agricultural machine and operates the agricultural machine.

Examples of walking-type agricultural machines include cultivators, farm masters, and transplanting machines. Examples of ride-on agricultural machines include tractors, ride-on transplanting machines, and combines.

Even when a walking-type agricultural machine is operated on a slope, since the operator operates the walking-type agricultural machine while always observing topography, the risk of an accident due to rollover is significantly low. However, since a ride-on agricultural machine is operated in a state in which the operator is riding on the ride-on agricultural machine, the risk of a rollover accident is significantly high due to other factors such as a blind spot and poor visibility during operation on a slope.

When a rollover accident of an agricultural machine occurs, since it is difficult for the agricultural machine to return to its original position by itself, emergency dispatch of a rescue vehicle is necessary. In particular, when an accident occurs on a farm road, unlike general national roads and local roads, the accident is not counted, and due to the nature of a back road in a rural area, elderly pedestrians are placed at a blind spot in terms of safety.

Recently, with the development of a wireless communication technology, telematics devices which can be electrically coupled to agricultural machines and communicate information on the agricultural machines with servers of agricultural machine manufacturers in a wireless manner have become widespread. When a telematics device is used, since a message for requesting emergency dispatch of a rescue vehicle for an agricultural machine can be quickly transmitted to the server, rescue can be performed faster and more accurately than when the operator requests the rescue vehicle to be dispatched by himself or herself.

An important factor in a rescue request using a telematics device is accurate determination of accident information such as whether an accident has occurred and the severity of the accident. When it is clear that an accident has occurred, accurate information on whether the accident has occurred and the severity of the accident can be transmitted together with a rescue request message to increase efficiency of the rescue request.

SUMMARY OF THE INVENTION

The present disclosure is directed to a system for preventing and notifying of an accident of an agricultural machine, which can prevent an accident of an agricultural machine by operating a display device to provide a safety warning to a rear driver when the agricultural machine is located within a hazard area, and a method of operating the same.

The present disclosure is also directed to a system for preventing and notifying of an accident of an agricultural machine, which can prevent an accident of an agricultural machine using information collected through linkage with surrounding Internet of Things (IoT) devices even when a rollover accident detection device is not present in the agricultural machine, and a method of performing the same.

The present disclosure is also directed to a system for preventing and notifying of an accident of an agricultural machine, which can respond immediately even when an unexpected accident occurs by notifying a manager terminal when an agricultural machine enters a hazard area, and a method of performing the same.

The present disclosure is also directed to a system for preventing and notifying of an accident of an agricultural machine, which can reduce power consumption by increasing brightness of a display device when a risk rating of a hazard area is high and lowering the brightness of the display device when the risk rating of the hazard area is low, and a method of performing the same.

The present disclosure is also directed to a system for preventing and notifying of an accident of an agricultural machine, which can reduce a battery replacement cost due to battery discharging by differentiating an identification mark according to an operating time and an operating environment of the agricultural machine and climate even at the same risk rating to change brightness of the display device according to the identification mark.

The problems to be solved by the present invention are not limited to those described above, and other problems that are not mentioned above should be clearly understood by those skilled in the art from the following description.

According to an aspect of the present invention, there is provided a system for preventing and notifying of an accident of an agricultural machine, which includes a main server configured to communicate with a plurality of relay servers in a rural area, receive location data of rollover accident detection devices located within a specific radius from the plurality of relay servers, provide the location data to a database (DB) server, and provide the location data of the rollover accident detection devices to a control server, the plurality of relay servers configured to collect the location data of the rollover accident detection devices located within the specific radius therefrom and provide the location data to the main server, the DB server configured to receive the location data and operating data of each of the plurality of rollover accident detection devices from the main server, set a hazard area using the location data and the operating data of each of the plurality of rollover accident detection devices, and store and manage the set hazard area in a hazard area DB, a control server configured to, when the location data of each of the plurality of rollover accident detection devices is received from the main server, communicate with the DB server and determine whether a location corresponding to the location data of each of the plurality of rollover accident detection devices corresponds to the hazard area, and provide a determination result, the plurality of rollover accident detection devices configured to match a version of the hazard area DB of the DB server to a version of the hazard area DB stored in each of the plurality of rollover accident detection devices when an agricultural machine starts, control brightness of a display device according to a risk rating pre-assigned to the hazard area when the agricultural machine has entered the hazard area on the basis of the hazard area database, operate the display device, and simultaneously provide an operating control command to an IoT device, and connected to a battery module of the agricultural machine to monitor an energy state of the battery module, and the IoT device configured to, when the operating control command is received from the rollover accident detection device, operate according to the operating control command to notify a driver of a vehicle within a radius therefrom of the presence of the agricultural machine.

According to another aspect of the present invention, there is provided a method of performing a system for preventing and notifying of an accident of an agricultural machine, which includes collecting, by a plurality of relay servers, location data of rollover accident detection devices located within the specific radius therefrom and providing the location data to a main server, communicating with, by the main server, the plurality of relay servers in a rural area, receiving location data of the rollover accident detection devices located within a specific radius from the plurality of relay servers, providing the location data to a database (DB) server, and providing the location data of the rollover accident detection devices to a control server, receiving, by the DB the server, the location data and operating data of each of the plurality of rollover accident detection devices from the main server, setting a hazard area using the location data and the operating data of each of the plurality of rollover accident detection devices, and storing and managing the set hazard area in a hazard area DB, when the location data of each of the plurality of rollover accident detection devices is received from the main server, communicating with the DB server and determining whether a location corresponding to the location data of each of the plurality of rollover accident detection devices corresponds to the hazard area to provide a determination result, when an agricultural machine starts, matching, by the rollover accident detection device, a version of the hazard area DB of the DB server to a version of the hazard area DB previously stored inside the rollover accident detection device, when the agricultural machine has entered the hazard area on the basis of the hazard area DB, controlling, by the rollover accident detection device, a brightness of a display device according to a risk rating pre-assigned to the hazard area to operate the display device and simultaneously providing an operating control command to the IoT device, and when the operating control command is received from the rollover accident detection device, operating, by the IoT device, according to the operating control command to notify a driver of a vehicle within a radius therefrom of the presence of the agricultural machine.

BRIEF DESCRIPTION OF THE DRAWINGS

The above and other objects, features and advantages of the present disclosure will become more apparent to those skilled in the art by describing exemplary embodiments thereof in detail with reference to the accompanying drawings, in which:

FIG. 4 is a flowchart for describing a method of preventing and notifying of an accident of an agricultural machine according to another embodiment of the present disclosure.

DETAILED DESCRIPTION OF EXEMPLARY EMBODIMENTS

Figure 1:
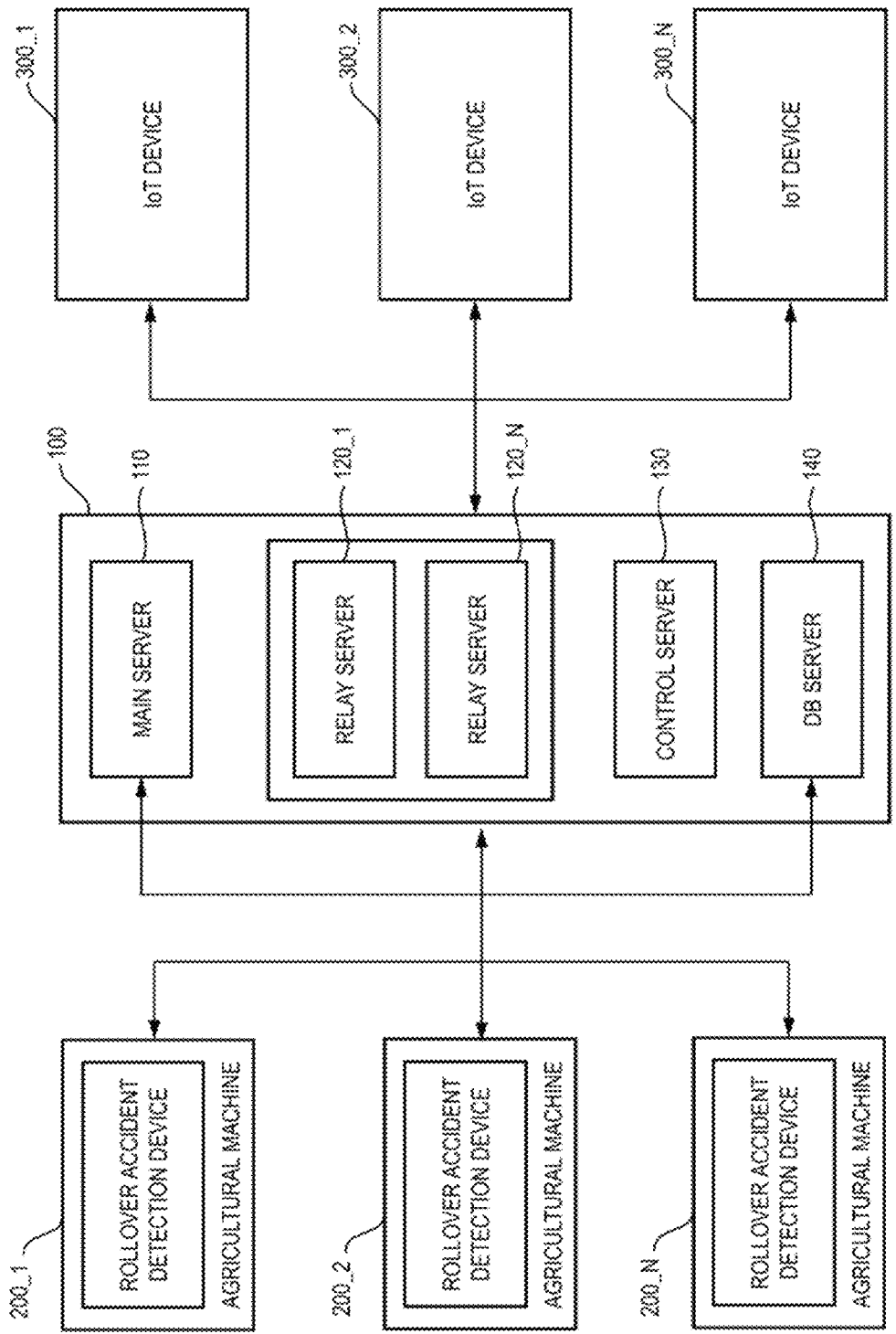
FIGS. 1 and 2 are network block diagrams for describing a system for preventing and notifying of an accident of an agricultural machine according to one embodiment of the present disclosure.

Advantages and features of the present disclosure and methods for achieving them will be made clear from embodiments described in detail below with reference to the accompanying drawings. However, the present disclosure is not limited to the exemplary embodiments described below and may be implemented in various other forms. The embodiments are provided such that the present disclosure will be thorough and complete and will fully convey the scope of the present disclosure to those skilled in the art to which the present disclosure pertains, and the present disclosure is defined by only the scope of the appended claims.

Unless defined otherwise, all terms (including technical and scientific terms) used herein may be used in a sense commonly understood by those skilled in the art to which the present disclosure pertains. In addition, terms which are defined in a commonly used dictionary are not ideally or excessively interpreted unless explicitly defined otherwise.

Terms used herein are for the purpose of describing the embodiments and are not intended to limit the present disclosure. In the present specification, the singular forms include the plural forms unless the context clearly dictates otherwise. It is noted that the terms "comprises" and/or "comprising" used herein does not exclude the presence or addition of one or more other components in addition to stated components.

Hereinafter, exemplary embodiments of the present invention will be described with reference to the accompanying drawings. In the drawings, the same reference numerals denote the same components.

Among the terms used herein, a "hazard area" may include curved sections, roads with steep slopes, roads without guardrails, places with high step differences such as drainage channels adjacent to roads, and areas with frequent accidents in the past.

Among the terms used herein, an "agricultural machine" is a ride-on mobility device which runs on land in a farming or fishing village and is used not only to grow and manage crops, but also to move for work within a unit village.

Examples of the agricultural machine may include tractors, combines, transplanting machines, farm masters, and transplanters which are used to grow and manage crops, as well as four-wheeled and two-wheeled vehicles used to move for work within a unit village.

Figure 2:
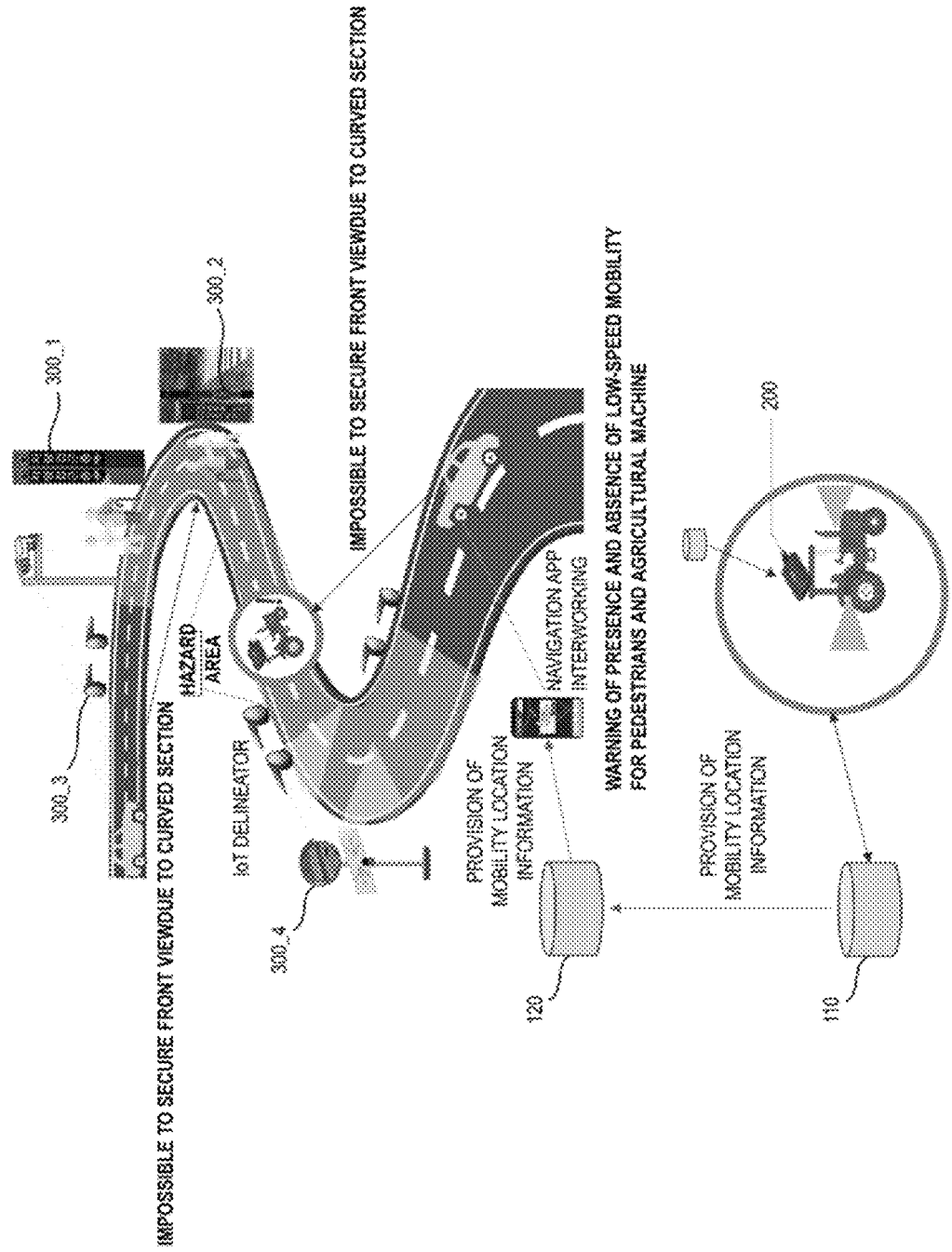

FIGS. 1 and 2 are network block diagrams for describing a system for preventing and notifying of an accident of an agricultural machine according to one embodiment of the present invention.

Referring to FIGS. 1 and 2, the system for preventing and notifying of an accident of an agricultural machine includes an agricultural machine accident prevention/notification server 100, rollover accident detection devices 200_1 to 200_N and Internet of Things (IoT) devices 300_1 to 300_N.

The agricultural machine accident prevention/notification server 100 includes a main server 110, a plurality of relay servers 120_1 to 120_N, a control server 130, and a database (DB) server 140.

The main server 110 communicates with the plurality of relay servers 120_1 to 120_N within a rural area, receives location data of the rollover accident detection devices 200_1 to 200_N located within a specific radius from the plurality of relay servers 120_1 to 120_N, stores the location data in the DB server 140, and provides the location data of the rollover accident detection devices 200_1 to 200_N to the control server 130.

Each of the plurality of relay servers 120_1 to 120_N collects the location data of the rollover accident detection devices 200_1 to 200_N located within a specific radius therefrom and provides the location data to the main server 110.

When connected to the plurality of rollover accident detection devices 200_1 to 200_N and peripheral devices (e.g., a vehicle navigation and a user terminal), each of the plurality of relay servers 120_1 to 120N provides the location data of the rollover accident detection devices 200_2 to 200_N to other rollover accident detection devices 200_1 to 200_N and the peripheral devices.

When the control server 130 receives the location data of each of the plurality of rollover accident detection devices 200_1 to 200_N from the main server 110, the control server 130 determines whether a location corresponds to the location data of each of the plurality of rollover accident detection devices through communication with the DB server 140 and indicates the determined location. The DB server 140 receives the location data of each of the plurality of rollover accident detection devices 200_1 to 200_N from the main server 110 and manages a hazard area DB using the location data of each of the plurality of rollover accident detection devices 200_1 to 200_N.

To this end, the DB server 140 determines the hazard area using map data. In this case, the DB server 140 may acquire the map data through an unmanned aerial vehicle, analyze the map data, determine the hazard area, and store location information on the hazard area in the hazard area DB.

Therefore, when operating data from the rollover accident detection devices 200_1 to 200_N is received, the control server 130 may compare location information of the operating data with the location information on the hazard area stored in the hazard area DB, determine whether the agricultural machine has entered the hazard area, and notify of a determination result through the rollover accident detection devices 200_1 to 200_N.

In addition, when the operating data is received from the rollover accident detection devices 200_1 to 200_N, the DB server 140 determines a risk rating of the hazard area according to the operating data, the number of operations in an operating area, and accident occurrence history. In this case, the risk rating is used to control brightness of a display device of the agricultural machine.

When many devices consuming power are always turned on in the agricultural machine, a phenomenon in which a battery cannot be charged due to insufficient electric power generation capacity occurs. For this reason, when operating the agricultural machine, an operator frequently drives a lighting device, such as a warning light, without always turning the lighting device on, and thus this becomes a cause of an accident. Therefore, as described above, when the brightness of the display device of the agricultural machine is controlled on the basis of the risk rating, it is possible to prevent an accident which may occur when the operator drives the agricultural machine without always turning the lighting device on, such as the warning light which consumes much power.

In addition, when the operating data is received from the rollover accident detection devices 200_1 to 200_N, the DB server 140 analyzes the operating data, calculates the number of operations for each operating area range, and determines an operating area having the number of operations that is more than the calculated number of operations as a frequent operating area range. Then, when the location information on the hazard area stored in the hazard area DB is present in the frequent operating area range, the DB server 140 updates the location information on the hazard area present in the frequent operating area range to the hazard area DB and then updates hazard area DB version information.

According to one example, the DB server 140 may increase a determination value of the risk rating of the hazard area whenever the hazard area belongs to the frequent driving area range.

According to another example, the DB server 140 may increase or decrease a risk rating value of the hazard area according to operating environments (i.e., an operating time and operating weather) of the hazard area.

To this end, the DB server 140 may determine a change criterion of the risk rating value (i.e., an increase or a decrease) on the basis of a correlation between elements of the operating environment and change the risk rating value of the hazard area according to the change criterion of the risk rating value.

For example, when the operating time is daytime and the operating weather is clear among the elements of the operating environment of the hazard area, the DB server 140 may determine to "decrease" a change criterion of the hazard area, thereby decreasing the risk rating value of the hazard area.

As described above, the DB server 140 may dynamically change the risk rating according to the risk rating value for each operating area whenever the risk rating value for each risk rating is changed.

In one example, the DB server 140 may determine to which range the risk rating value belongs on the basis of a risk rating determination range for each hazard area and determine the risk rating indicated by the corresponding range as a final risk rating of the hazard area.

As described above, since the DB server 140 determines the risk rating for each hazard area, when the operator of the agricultural machine enters the hazard area, the DB server 140 may control brightness of the display device of the agricultural machine according to the risk rating of the hazard area.

Therefore, according to the present invention, when the risk rating of the hazard area is high, the brightness of the display device is increased, whereas, when the risk rating of the hazard area is low, the brightness of the display device is decreased so that power consumption can be reduced.

In addition, when the operator starts the agricultural machine to begin an operation, the DB server 140 receives operation start location information and hazard area DB version information from the rollover accident detection devices 200_1 to 200_N. Then, the DB server 140 compares the hazard area DB version information with the hazard area DB version information stored therein, provides the location information of the hazard area to the rollover accident detection devices 200_1 to 200_N according to the comparison result, and updates the hazard area DB of each of the rollover accident detection devices 200_1 to 200_N.

For example, when the hazard area DB version information of the rollover accident detection devices 200_1 to 200_N is different from the hazard area DB version information of the rollover accident detection devices stored in the DB server 140, the DB server 140 provides the location information of the hazard area to the rollover accident detection devices 200_1 to 200_N and updates the hazard area DB of each of the rollover accident detection devices 200_1 to 200_N. Then, each of the rollover accident detection devices 200_1 to 200_N updates the hazard area DB version information and synchronizes the updated hazard area DB version information with the hazard area DB version information stored in the agricultural machine accident prevention/notification server 100.

As another example, when the hazard area DB version information of the rollover accident detection devices 200_1 to 200_N is the same as the hazard area DB version information of the rollover accident detection devices stored in the DB server 140, the DB server 140 determines that the hazard area DB version information of the rollover accident detection devices 200_1 to 200_N is the latest information and does not perform an additional update.

When the operator is successfully authenticated through a user authentication process and the agricultural machine turns on before the user starts the agricultural machine, the rollover accident detection devices 200_1 to 200_N detect a rollover accident of the agricultural machine.

The rollover accident detection devices 200_1 to 200_N are installed in agricultural machines to detect rollover accidents of the agricultural machines. The hazard area DB is stored in each of the rollover accident detection devices 200_1 to 200_N. When the agricultural machines start and then the agricultural machines are operated, the rollover accident detection devices 200_1 to 200N provide the hazard area DB version information to the agricultural machine accident prevention/notification server 100, thereby synchronizing the hazard area DB version information of the agricultural machine accident prevention/notification server 100 with the hazard area DB version information of the rollover accident detection devices 200_1 to 200_N.

The rollover accident detection devices 200_1 to 200_N collect operating data of agricultural machines and then provide the collected operating data to the agricultural machine accident prevention/notification server 100. In this case, the operating data includes state information and location information of the agricultural machines. Examples of the state information include whether the machine is started, a latitude, a longitude, a speed, an inclination, a battery voltage, whether the machines has entered a hazard area, a risk rating of the hazard area, whether an accident occurs, and an operating environment.

In addition, when the agricultural machines start and then the agricultural machines are operated, the rollover accident detection devices 200_1 to 200_N each provide operation start location information and the hazard area DB version information to the agricultural machine accident prevention/notification server 100.

Therefore, the agricultural machine accident prevention/notification server 100 determines whether the hazard area DB version information of each of the rollover accident detection devices 200_1 to 200_N is different from the hazard area DB version information of each rollover accident detection device stored in the agricultural machine accident prevention/notification server 100. Then, the agricultural machine accident prevention/notification server 100 provides the location information of the hazard area to the rollover accident detection devices 200_1 to 200_N according to a determination result and updates the hazard area DB of each of the rollover accident detection devices 200_1 to 200_N. Thereafter, the agricultural machine accident prevention/notification server 100 updates the hazard area DB version information stored therein. In this case, the hazard area DB version information may be information on the date on which the hazard area DB is updated.

As described above, when the rollover accident detection devices 200_1 to 200_N receive the location information of the hazard area from the agricultural machine accident prevention/notification server 100 and then update the hazard area DB, the rollover accident detection devices 200_1 to 200_N update the hazard area DB version information. In this case, the hazard area DB version information may be information on the date on which the hazard area DB is updated.

In addition, when an inclination of the agricultural machine in the operating data is greater than or equal to a critical inclination, the rollover accident detection devices 200_1 to 200_N compare the location information of the agricultural machine with the location information of the hazard area stored in the hazard area DB and determines whether an accident occurs according to the comparison result.

For example, when the inclination of the agricultural machine in the operating data is greater than or equal to a critical inclination and the location information of the agricultural machine does not correspond to the location information of the hazard area stored in the hazard area DB, the rollover accident detection devices 200_1 to 200_N may determine that the agricultural machine has moved from a road to a rice paddy or a field, rather than an accident having occurred.

As another example, when an inclination of the agricultural machine in the operating data is greater than or equal to a critical inclination and the location information of the agricultural machine corresponds to the location information of the hazard area stored in the hazard area DB, the rollover accident detection devices 200_1 to 200_N may determine that an accident is suspected and generate an accident event.

In addition, the rollover accident detection devices 200_1 to 200_N are each connected to a battery module (not shown) of the agricultural machine, determine a state of energy stored in the battery module, and control a temporary battery module (not shown) to supply power according to the energy state. In this case, the temporary battery module may be implemented in a sunlight module, may convert sunlight energy into electric energy, and may store the electric energy.

In one example, when an amount of the energy stored in the battery module is less than or equal to a predetermined threshold value, the rollover accident detection devices 200_1 to 200_N each perform control such that power is supplied to the temporary battery module.

The IoT devices 300_1 to 300N operate when the rollover accident detection devices determine that the agricultural machine has entered the hazard area, and when a vehicle is approaching the agricultural machine within a predetermined radius therefrom, the IoT devices 300_1 to 300_N each provide a display notification in a corresponding direction to notify a driver of the vehicle of a location of the agricultural machine or notify the operator of the agricultural machine of the location of the driver of the vehicle. The IoT devices 300_1 to 300_N are each implemented as an IoT mirror-type reflector, an IoT delineator, an IoT image analysis device, an IoT electronic notice board, a notification button, or the like.

In one example, when the IoT reflector 300 is implemented as an IoT reflector and the rollover accident detection devices 200_1 to 200_N each determine that the agricultural machine has entered the hazard area, the IoT reflector 300 may control a light source (e.g., a light-emitting diode (LED)) to flicker at specific time intervals, thereby notifying the operator operating the agricultural machine of the location of the vehicle.

In the above example, the IoT reflector 300 may notify the operator operating the agricultural machine of the location of the vehicle by increasing or decreasing a flickering speed of the light source according to a distance between the vehicle and the agricultural machine. That is, the IoT reflector 300 sets the flickering speed of the light source higher as the distance between the vehicle and the agricultural machine decreases, whereas, the IoT reflector 300 sets the flickering speed of the light source lower as the distance between the vehicle and the agricultural machine increases.

In another example, when the IoT devices 300_1 to 300_N are implemented as IoT delineators, the IoT devices 300_1 to 300_N are installed in road guardrails and a hazard area.

In still another example, when the IoT devices 300_1 to 300_N are implemented as IoT electronic notice boards, the IoT devices 300_1 to 300_N communicate with the agricultural machine accident prevention/notification server 100 to display content notifying that the agricultural machine has entered the hazard area.

Figure 3:
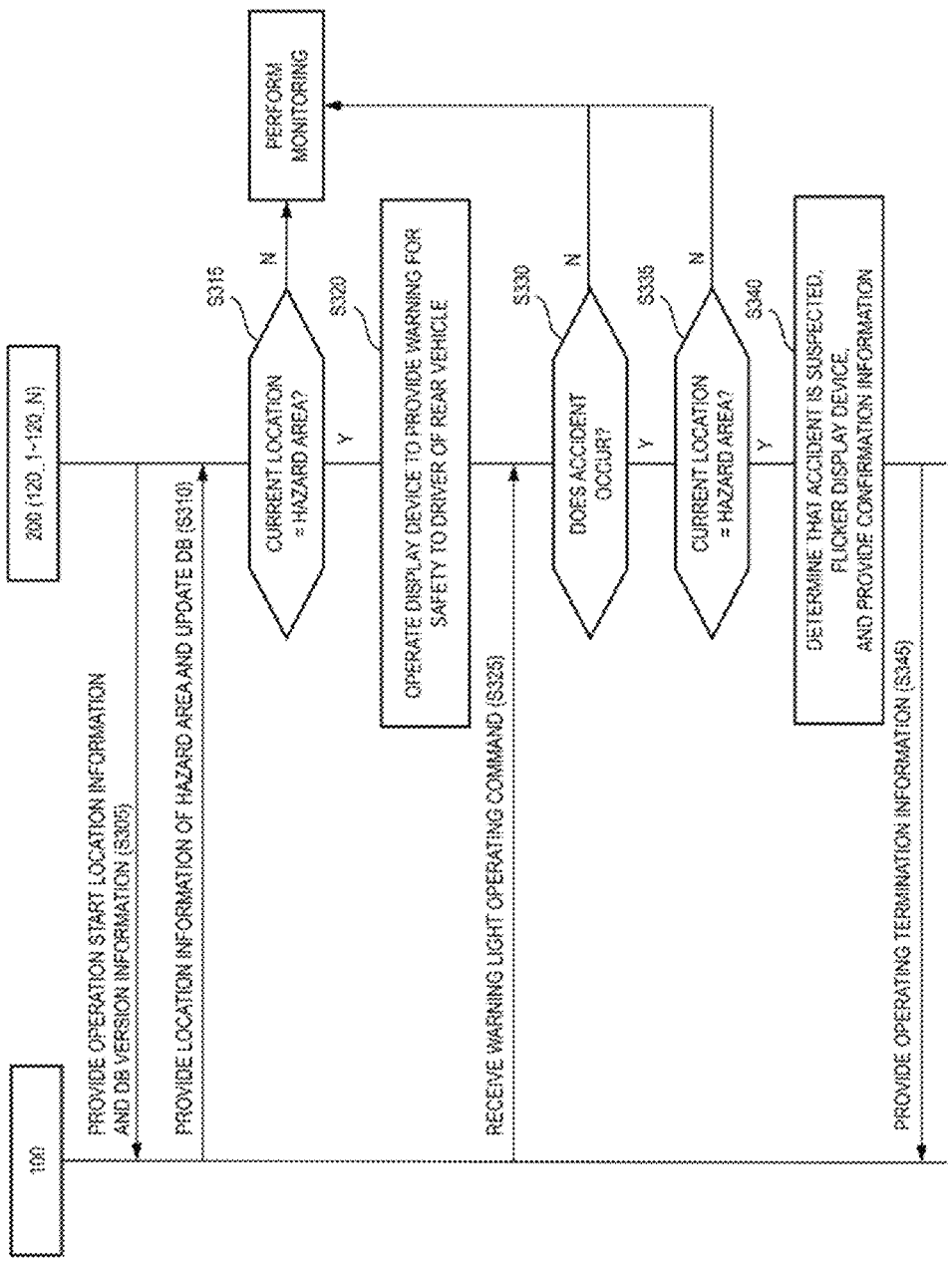
FIG. 3 is a flowchart for describing a method of preventing and notifying of an accident of an agricultural machine according to one embodiment of the present disclosure.

FIG. 3 is a flowchart for describing a method of preventing and notifying of an accident of an agricultural machine according to one embodiment of the present invention.

Referring to FIG. 3, when an agricultural machine starts and then the agricultural machine is operated, a rollover accident detection device 200 provides operation start location information and hazard area DB version information to the agricultural machine accident prevention/notification server 100 (S305).

When the operation start location information and the hazard area DB version information are received from the rollover accident detection device 200, the agricultural machine accident prevention/notification server 100 compares the received hazard area DB version information with the hazard area DB version information stored therein. Then, the agricultural machine accident prevention/notification server 100 provides location information of a hazard area to the rollover accident detection device 200 according to the comparison result and updates the hazard area DB of the rollover accident detection device 200 (S310).

For example, in operation S310, when the hazard area DB version information of the rollover accident detection device 200 is different from the hazard area DB version information stored in the agricultural machine accident prevention/notification server 100, the agricultural machine accident prevention/notification server 100 provides the location information of the hazard area to the rollover accident detection device 200 and updates the hazard area DB of the rollover accident detection device 200. Then, the rollover accident detection device 200 updates the hazard area DB version information and synchronizes the updated hazard area DB version information with the hazard area DB version information stored in the agricultural machine accident prevention/notification server 100.

As another example, in operation S310, when the hazard area DB version information of the rollover accident detection devices 200 is the same as the hazard area DB version information stored in the agricultural machine accident prevention/notification server 100, the agricultural machine accident prevention/notification server 100 determines that the hazard area DB version information of the rollover accident detection device 200 is the latest information and does not perform a separate update.

When the location information of the agricultural machine corresponds to the location information of the hazard area stored in the hazard area DB, the rollover accident detection device 200 determines that the agricultural machine is located in the hazard area (S315) and operates a display device to provide a warning for safety to a driver of a rear vehicle (S320).

When a warning light operating command is received from the control server 130 (S325), the rollover accident detection device 200 operates a display device to provide location information (S325).

When an inclination of the agricultural machine in the operating data is greater than or equal to a critical inclination, the rollover accident detection device 200 compares the location information of the agricultural machine with the location information of the hazard area stored in the hazard area DB and determines whether an accident occurs according to the comparison result (S330).

As one example, in operation S330, when the inclination of the agricultural machine in the operating data is greater than or equal to a critical inclination and the location information of the agricultural machine does not correspond to the location information of the hazard area stored in the hazard area DB, the rollover accident detection device 200 may determine that the agricultural machine has moved from a road to a rice paddy or a field, rather than an accident having occurred.

As another example, in operation S330, when the inclination of the agricultural machine in the operating data is greater than or equal to a critical inclination and the location information of the agricultural machine corresponds to the location information of the hazard area stored in the hazard area DB (S335), the rollover accident detection device 200 determines that an accident is suspected, flickers the display device, and provides accident confirmation information to the control server 130 (S340).

When the agricultural machine is turned off and thus the operation of the agricultural machine is terminated, the rollover accident detection device 200 provides operating termination information to the control server 130 (S345).

When the rollover accident detection device 200 determines that a dangerous situation has occurred, the IoT devices 300_1 to 300N operate and display the dangerous situation. The IoT devices 300_1 to 300_N may each be implemented as an IoT reflector, an IoT delineator, an image analysis device, an IoT electronic notice board, or an IoT notification button. The IoT devices 300_1 to 300_N operate when the rollover accident detection device determines that the agricultural machine has entered the hazard area, and when a vehicle is approaching the agricultural machine within a predetermined radius therefrom, the IoT devices 300_1 to 300N each provide a display notification in a corresponding direction to notify a driver of the vehicle of a location of the agricultural machine or notify the operator of the agricultural machine of a location of the vehicle.

In one example, when the IoT reflector 300 is implemented as an IoT reflector and the rollover accident detection device 200 determines that the agricultural machine has entered the hazard area, the IoT reflector 300 may control a light source (e.g., an LED) to flicker at specific time intervals, thereby notifying the operator operating the agricultural machine.

In the above example, the IoT reflector 300 may notify the operator operating the agricultural machine of the location of the vehicle by increasing or decreasing a flickering speed of the light source according to a distance between the vehicle and the agricultural machine. That is, the IoT reflector 300 sets the flickering speed of the light source higher as the distance between the vehicle and the agricultural machine decreases, whereas, the IoT reflector 300 sets the flickering speed of the light source lower as the distance between the vehicle and the agricultural machine increases.

In another example, when the IoT devices 300_1 to 300_N are implemented as IoT delineators, the IoT devices 300_1 to 300_N are installed in road guardrails and a hazard area.

In still another example, when the IoT devices 300_1 to 300_N are implemented as IoT electronic notice boards, the IoT devices 300_1 to 300_N communicate with the agricultural machine accident prevention/notification server 100 to display content notifying that the agricultural machine has entered the hazard area.

FIG. 4 is a flowchart for describing a method of preventing and notifying of an accident of an agricultural machine according to another embodiment of the present invention.

Referring to FIG. 4, when an agricultural machine starts and then the agricultural machine is operated, a rollover accident detection device 200 provides operation start location information and hazard area DB version information to the agricultural machine accident prevention/notification server 100 (S405).

That is, when the operation start location information and the hazard area DB version information are received from the rollover accident detection device 200, the agricultural machine accident prevention/notification server 100 compares the received hazard area DB version information with the hazard area DB version information stored therein (S410). Then, the agricultural machine accident prevention/notification server 100 provides location information of a hazard area to the rollover accident detection device 200 according to the comparison result and updates the hazard area DB of the rollover accident detection device 200 (S415).

For example, in operation S410, when the hazard area DB version information of the rollover accident detection device 200 is different from the hazard area DB version information stored in the agricultural machine accident prevention/notification server 100 ("N" of S410), the agricultural machine accident prevention/notification server 100 provides the location information of the hazard area to the rollover accident detection device 200 and updates the hazard area DB of the rollover accident detection device 200 (S415). Then, the rollover accident detection device 200 updates the hazard area DB version information and synchronizes the updated hazard area DB version information with the hazard area DB version information stored in the agricultural machine accident prevention/notification server 100 (S420).

As another example, in operation S410, when the hazard area DB version information of the rollover accident detection devices 200 is the same as the hazard area DB version information stored in the agricultural machine accident prevention/notification server 100 ("Y" of S410), the agricultural machine accident prevention/notification server 100 determines that the hazard area DB version information of the rollover accident detection device 200 is the latest information and does not perform a separate update.

When the location information of the agricultural machine corresponds to the location information of the hazard area stored in the hazard area DB ("Y" of S425), the rollover accident detection device 200 provides an operating command to each of the IoT devices 300_1 to 300_N (S430).

Meanwhile, the disclosed embodiments may be implemented the form of a recording medium storing commands executable by a computer. The commands may be stored in the form of program codes and, when executed by a processor, may generate a program module to perform the operations of the disclosed embodiments. The recording medium may be implemented as a computer-readable recording medium.

Examples of the computer-readable recording medium include all kinds of recording media storing instructions which are decipherable by a computer. For example, there may be a read only memory (ROM), a random access memory (RAM), a magnetic tape, a magnetic disk, a flash memory, an optical data storage device, and the like.

In addition, the computer-readable recording medium may be provided in the form of a non-transitory storage medium. Here, "non-transitory storage medium" only means that it is a tangible device and does not contain signals (e.g., electromagnetic waves), and this term does not distinguish between a case in which data is semi-permanently stored in a storage medium and a case in which data is temporarily stored. For example, the "non-transitory storage medium" may include a buffer in which data is temporarily stored.

According to one example, the methods according to various embodiments disclosed herein may be included and provided in a computer program product. The computer program product may be traded between a seller and a buyer as a commodity. The computer program product is distributed in the form of a machine-readable recording medium (e.g., a compact disc read only memory (CD-ROM)), distributed through an application store (e.g., Play Store™), directly distributed between two user devices (e.g., smartphones), or distributed online (e.g., downloaded or uploaded). In the case of the online distribution, at least a portion of a computer program product (e.g., a downloadable app) may be stored at least temporarily or generated temporarily in a device-readable recording medium such as a manufacturer's server, an application store server, or a relay server's memory.

In accordance with embodiments of the present invention, when an agricultural machine is located within a hazard area, a display device is operated to provide a warning for safety to a driver of a rear vehicle so that an accident of the agricultural machine can be prevented.

In accordance with embodiments of the present invention, even when a rollover accident detection device is not present in the agricultural machine, an accident of the agricultural machine can be prevented using information collected through interworking with surrounding IoT devices.

In accordance with embodiments of the present invention, when the agricultural machine enters a hazard area, a terminal of a manager is notified of the entry of the agricultural machine so that an immediate response is possible even when an unexpected accident occurs.

In accordance with embodiments of the present invention, when a risk rating of the hazard area is high, a brightness of the display device is increased, whereas, when the risk rating of the hazard area is low, the brightness of the display device is decreased so that power consumption can be reduced.

In accordance with embodiments of the present invention, even with the same risk rating, an identification display is differentiated according to an operation time and an operating environment of the agricultural machine and climate, and the brightness of the display device is changed according to the identification display even with the same risk rating so that a battery replacement cost due to battery discharging can be reduced.

Embodiments according to the present disclosure have been described with reference to the accompanying drawings. It will be apparent to those skilled in the art that various changes and modifications may be made without departing from the spirit and scope of the present disclosure. Therefore, it should be understood that the above-described embodiments are not restrictive but illustrative in all aspects.

What is claimed is:

1. A system for preventing and notifying of an accident of an agricultural machine, which includes an agricultural machine accident prevention/notification server, a rollover accident detection device, and an Internet of things (IoT) device, the system comprising:
    a main server configured to communicate with a plurality of relay servers in a rural area, receive location data of rollover accident detection devices located within a specific radius from the plurality of relay servers, provide the location data to a database (DB) server, and provide the location data of the rollover accident detection devices to a control server;
    the plurality of relay servers configured to collect the location data of the rollover accident detection devices located within the specific radius therefrom and provide the location data to the main server;
    the DB server configured to receive the location data and operating data of each of the plurality of rollover accident detection devices from the main server, set a hazard area using the location data and the operating data of each of the plurality of rollover accident detection devices, and store and manage the set hazard area in a hazard area DB;
    a control server configured to, when the location data of each of the plurality of rollover accident detection devices is received from the main server, communicate with the DB server and determine whether a location corresponding to the location data of each of the plurality of rollover accident detection devices corresponds to the hazard area, and provide a determination result;
    the plurality of rollover accident detection devices configured to match a version of the hazard area DB of the DB server to a version of the hazard area DB stored in each of the plurality of rollover accident detection devices when an agricultural machine starts, control brightness of a display device according to a risk rating pre-assigned to the hazard area when the agricultural machine has entered the hazard area on the basis of the hazard area database, operate the display device, and simultaneously provide an operating control command to an IoT device, and connected to a battery module of the agricultural machine to monitor an energy state of the battery module; and
    the IoT device configured to, when the operating control command is received from the rollover accident detection device, operate according to the operating control command to notify a driver of a vehicle within a radius therefrom of presence of the agricultural machine.

2. The system of claim 1, wherein:
    the rollover accident detection device generates operating data during operation of the agricultural machine and provides the operating data to the agricultural machine accident prevention/notification server; and
    the agricultural machine accident prevention/notification server updates the hazard area DB using the operating data and then updates hazard area DB version information.

3. The system of claim 1, wherein the agricultural machine accident prevention/notification server:
    compares hazard area DB version information of synchronization information received from the rollover accident detection device with hazard area DB version information of a hazard area DB located inside the agricultural machine accident prevention/notification server; and
    provides the location information of the hazard area of the hazard area DB located inside the agricultural machine accident prevention/notification server to update the hazard area DB of the rollover accident detection device.

4. The system of claim 1, wherein:
    the IoT device is implemented as an IoT reflector, an IoT delineator, an image analysis device, an IoT electronic notice board, or an IoT notification button; and the IoT device is operated when the rollover accident detection device determines that the agricultural machine has entered the hazard area; and
    when a vehicle is approaching the agricultural machine within a predetermined radius therefrom, the IoT device provides a display notification in a corresponding direction to notify a driver of the vehicle of a location of the agricultural machine or notify an operator of the agricultural machine of a location of the vehicle.

5. A method of preventing and notifying of an accident of an agricultural machine, the method comprising:
    collecting, by a plurality of relay servers, location data of rollover accident detection devices located within the specific radius therefrom and providing the location data to a main server;
    communicating with, by the main server, the plurality of relay servers in a rural area, receiving location data of the rollover accident detection devices located within a specific radius from the plurality of relay servers, providing the location data to a database (DB) server, and providing the location data of the rollover accident detection devices to a control server;
    receiving, by the DB the server, the location data and operating data of each of the plurality of rollover accident detection devices from the main server, setting a hazard area using the location data and the operating data of each of the plurality of rollover accident detection devices, and storing and managing the set hazard area in a hazard area DB;
    when the location data of each of the plurality of rollover accident detection devices is received from the main server, communicating with the DB server and determining whether a location corresponding to the location data of each of the plurality of rollover accident detection devices corresponds to the hazard area to provide a determination result;

when an agricultural machine starts, matching, by the rollover accident detection device, a version of the hazard area DB of the DB server to a version of the hazard area DB previously stored inside the rollover accident detection device;

when the agricultural machine has entered the hazard area on the basis of the hazard area DB, controlling, by the rollover accident detection device, a brightness of a display device according to a risk rating pre-assigned to the hazard area to operate the display device and simultaneously providing an operating control command to the IoT device; and when the operating control command is received from the rollover accident detection device, operating, by the IoT device, according to the operating control command to notify a driver of a vehicle within a radius therefrom of presence of the agricultural machine.

6. The method of claim 5, comprising:

generating, by the rollover accident detection device, operating data during operation of the agricultural machine and providing the operating data to the agricultural machine accident prevention/notification server; and updating, by the agricultural machine accident prevention/notification server, the hazard area DB using the operating data and then updating hazard area DB version information.

7. The system of claim 5, wherein the matching, by the rollover accident detection device, of the version of the hazard area DB of the DB server to the version of the hazard area DB previously stored inside the rollover accident detection device when the agricultural machine starts includes:

comparing hazard area DB version information of synchronization information received from the rollover accident detection device with the hazard area DB version information of the hazard area DB located inside the rollover accident detection device; and updating the hazard area DB of the rollover accident detection device by providing location information of the hazard area of the hazard area DB located inside the rollover accident detection device according to the comparison result.

8. The system of claim 5, wherein:

operating and displaying, by the rollover accident detection device, a dangerous situation when the IoT device determines that a dangerous situation occurs includes operating, by the IoT device, when the rollover accident detection device determines that the agricultural machine enters the hazard area and a vehicle is approaching the agricultural machine within a predetermined radius therefrom, providing, by the IoT device, a display notification in a corresponding direction to notify a driver of the vehicle of a location of the agricultural machine or notify an operator of the agricultural machine of a location of the vehicle; and the IoT device is implemented as an IoT reflector, an IoT delineator, an image analysis device, an IoT electronic notice board, or an IoT notification button.

* * * * *